(12) United States Patent
Smith et al.

(10) Patent No.: US 7,325,973 B2
(45) Date of Patent: Feb. 5, 2008

(54) SYSTEMS AND METHODS FOR REDUCING SLIDE BEARING TOLERANCES

(76) Inventors: Thomas J. Smith, 2410 Stuart Ct., Madison, WI (US) 53704; Normond L. Campbell, S10110 County Highway C, Sauk City, WI (US) 53583

( * ) Notice: Subject to any disclaimer, the term of this patent is extended or adjusted under 35 U.S.C. 154(b) by 66 days.

(21) Appl. No.: 11/104,816

(22) Filed: Apr. 13, 2005

(65) Prior Publication Data
US 2006/0233473 A1    Oct. 19, 2006

(51) Int. Cl.
*F16C 29/12* (2006.01)
(52) U.S. Cl. ............................... 384/38; 384/42
(58) Field of Classification Search .................. 384/10, 384/22, 26, 35, 37, 38, 40–42
See application file for complete search history.

(56) References Cited

U.S. PATENT DOCUMENTS

| | | | |
|---|---|---|---|
| 4,630,872 A | 12/1986 | Teramachi | |
| 4,637,738 A | 1/1987 | Barkley | |
| 4,941,758 A | 7/1990 | Osawa | |
| 5,076,714 A | 12/1991 | Teramachi | |
| 5,143,454 A | 9/1992 | Morita | |
| 5,176,454 A | 1/1993 | Schlereth | |
| 5,181,780 A | 1/1993 | Morita | |
| 5,388,913 A | 2/1995 | Cawley et al. | |
| 5,484,210 A | 1/1996 | Gallone | |
| 6,019,514 A | 2/2000 | Feinstein | |
| 6,290,395 B1 * | 9/2001 | Pletschet | 384/38 |
| 6,402,381 B1 | 6/2002 | Shirai et al. | |
| 6,461,046 B2 | 10/2002 | Kahl | |

* cited by examiner

*Primary Examiner*—Thomas R. Hannon
(74) *Attorney, Agent, or Firm*—Lathrop & Clark LLP

(57) ABSTRACT

A first component includes either linear bearings or linear shafts that are located at a fixed hole-to-hole or center-to-center distance. A second component, having linear shafts or linear bearings, respectively, is capable of adjusting the center-to-center or hole-to-hole distance of those second linear shafts or linear bearings. The center-to-center or hole-to-hole distance can be adjusted by relative motion between a first sub-component and a second sub-component of the second component, and/or deforming an elastically-deformable element of the second component. The second component can include a rigid stabilizing element and an elastically-deformable element. The elastically-deformable element can act as a pseudo-spring to adjust the center-to-center or hole-to-hole distance of the linear shafts or bearings that are attached to this second component to the appropriate fixed hole-to-hole or center-to-center distance of the other of the linear bearings or linear shafts as the carriage travels along the path of motion.

13 Claims, 7 Drawing Sheets

SYSTEMS AND METHODS FOR REDUCING SLIDE BEARING TOLERANCES

BACKGROUND OF THE INVENTION

1. Field of the Invention

This invention is directed to systems and methods that allow for dynamically adjusting the true position of highly-toleranced multiple slide bearing track systems.

2. Related Art

Slide bearings allow for controlled movement over a long linear path of motion. The path of motion is typically determined by a highly toleranced linear shaft. Typically, two linear shafts are attached to opposite sides of a first part. Each linear shaft, in its installed position on the first part, typically must meet certain requirements for orientation and straightness. Typically, two or more linear bearings, each usually comprising a bearing portion contained with a carriage, are attached to each side of a second part and slide along each linear shaft to allow the first and second parts to move relative to each other. Conventionally, the first and second parts are rigid and are not able to move, flex or deform. Thus, the positions and orientations of the linear bearings and linear shafts on the first and second parts are fixed.

Typically, the position and orientation of each linear bearing on the second part must also be highly dimensionally controlled. If, at any point, due to the relative orientation and/or position of a linear bearing relative to the linear shaft it moves along, the effective inner diameter of any linear bearing is smaller the outer diameter of the linear shaft, then that linear bearing will bind up as it moves along that linear shaft. Conversely, if the inner diameter of the linear bearings is significantly larger that the outer diameter of the corresponding linear shaft, then the path of motion of the linear bearing along the linear shaft will be less controlled and may result in unacceptable wobble along the path of motion of the slide bearing.

Slide bearings are commonly used in tracking systems. A given track system may require single or multiple shafts and bearings, properly aligned, to stabilize the object that is traveling down the path of the slide bearing.

SUMMARY OF THE DISCLOSED EMBODIMENTS

The most common problem in multi-slide bearing tracking systems is controlling the alignment and positioning of the multiple linear shafts relative to each other and/or to the slide bearing carriages. If there is a long path of motion, the multiple linear bearings and shafts must remain correctly aligned along the entire path of motion. If one or more of the shafts are either translationally or rotationally misaligned relative to the corresponding linear bearings or to each other, then the linear bearings will likely interfere with the misaligned shaft and bind up. Similarly, if any of the linear bearings are either translationally or rotationally misaligned relative to the corresponding shaft or each other, the linear bearings will likely interfere with the shaft and bind up. In most applications, an engineer must either go through the painstaking and highly expensive process of designing a machine with precisely controlled dimensions, along with developing a manufacturing process that controls the orientation and position of the linear bearings and linear shafts, as they are attached to the first and second parts, to a very high tolerance, or be willing to live with a certain amount of wobble along the path of motion.

It would be advantageous to create a slide bearing track system in which either the precision linear shafts or the linear bearings are able to dynamically adjust their relative position and/or orientation as the carriages travel along the length of the shafts.

This invention provides systems and methods for creating a dynamically adjusting shaft and linear bearing system.

This invention separately provides systems and methods for reduced tolerance tracking systems using two or more slide bearings.

This invention separately provides systems and methods for attaching a relatively rigid structural element with one or more attached linear bearings or shafts to a relatively flexible structural element.

This invention separately provides systems and methods for slide bearing track systems with attached bearings or shafts such that the hole-to-hole or center-to-center dimensions of the attached elements can be automatically adjusted to bring such dimensions into true relative to their corresponding slide bearing components.

This invention separately provides systems and methods for adjusting a true position, in real time, of precision linear shafts, linear bearings, or other bearings requiring high tolerances.

This invention separately provides systems and methods for nesting multiple dynamically-adjusting slide bearing track systems.

In various exemplary embodiments of systems and methods according to this invention, a first track component includes either at least two sets of linear bearings or at least two linear shafts that are statically located at a fixed hole-to-hole or center-to-center distance. In various exemplary embodiments, a second component, to which are attached either two linear shafts or two sets of linear bearings, respectively, is capable of adjusting the center-to-center or hole-to-hole distance of those second linear shafts or sets of linear bearings. In various exemplary embodiments, the center-to-center distance or hole-to-hole distance is adjusted by allowing relative motion between a first sub-component and a second sub-component of the second component, and/or by deforming an elastically-deformable element of the second component.

In various exemplary embodiments, the second component includes a rigid stabilizing element and an elastically-deformable element. Accordingly, at least the elastically-deformable element of this second component has the ability to behave as a pseudo-spring and adjust either the center-to-center distance of the linear shafts or the hole-to-hole distance of the linear bearings that are attached to this second component to the appropriate fixed hole-to-hole distance of the linear bearings or center-to-center distance of the linear shafts of the other of the linear bearings or linear shafts as the carriage travels along the path of motion.

In various exemplary embodiments, the second component includes first and second sub-components that are able to move relative to each other to adjust either the hole-to-hole distance of the linear bearings or center-to-center distance of the linear shafts that are attached to this second component to the appropriate fixed position of the other of the linear bearings or linear shafts as the carriage travels along the path of motion. In various exemplary embodiments, the first and second components are attached to each other by a hinge mechanism, such that the second sub-component can rotate relative to the first sub-component. In various exemplary embodiments, the first and second sub-components are attached to each other so that the first and second sub-components can move laterally relative to each other. In still other exemplary embodiments, the second component can include first-third sub-components, where the first and second sub-components are able to move laterally relative to each other, while the third sub-component is able to rotate relative to the first or second sub-component.

These and other features and advantages of various exemplary embodiments of systems and methods according to this invention are described in, or are apparent from, the following detailed description.

BRIEF DESCRIPTION OF DRAWINGS

Various exemplary embodiments of systems and methods of this invention will be described in detail, with references to the following figures, wherein.

DETAILED DESCRIPTION OF EXEMPLARY EMBODIMENTS

Various exemplary embodiments of dynamically-adjusting track systems and methods according to this invention use a primary control/mounting plate with a fixed pair of linear bearings to position a primary linear shaft and a second pair of linear bearings to position a secondary linear shaft, or vice versa. An assembly of stabilizers and self-positioning flexible and/or self-adjustable guides are employed to automatically maintain the position of succeeding bearing platforms and/or linear bearing/shaft pairings. The assembly of stabilizers and self-positioning flexible and/or self-adjustable guides can be implemented using sheet metal as structural supports. The primary linear bearings and linear shaft are used to control the alignment. In various exemplary embodiments, the secondary linear bearings and linear shaft are used for planar alignment about the travel axis of the primary linear bearings and linear shaft. The assembly of stabilizers and self-positioning and/or self adjustable flexible guides allow further bearing platforms and/or linear bearing/shaft pairs to free float and yet be aligned at the position where close tolerance is required.

One advantage of various exemplary embodiments of dynamically adjusting track systems and methods according to this invention is the light weight made possible by the use of sheet metal. While various exemplary embodiments of mounting systems according to this invention use Igus bearings, any type of linear bearing and complementary linear shafts can be used. Various exemplary embodiments of systems and methods according to this invention can use sheet metal, sheet aluminum, plastic sheet, or any other type of sheet material. Dimensional steel or other material could also be used, but such materials provide little additional benefit. If slide movement is desired between stabilizers and flexible and/or self-adjustable guides, it should be appreciated that rubber, plastic, metal, or any material that would allow such movement can be used.

Figure 1:
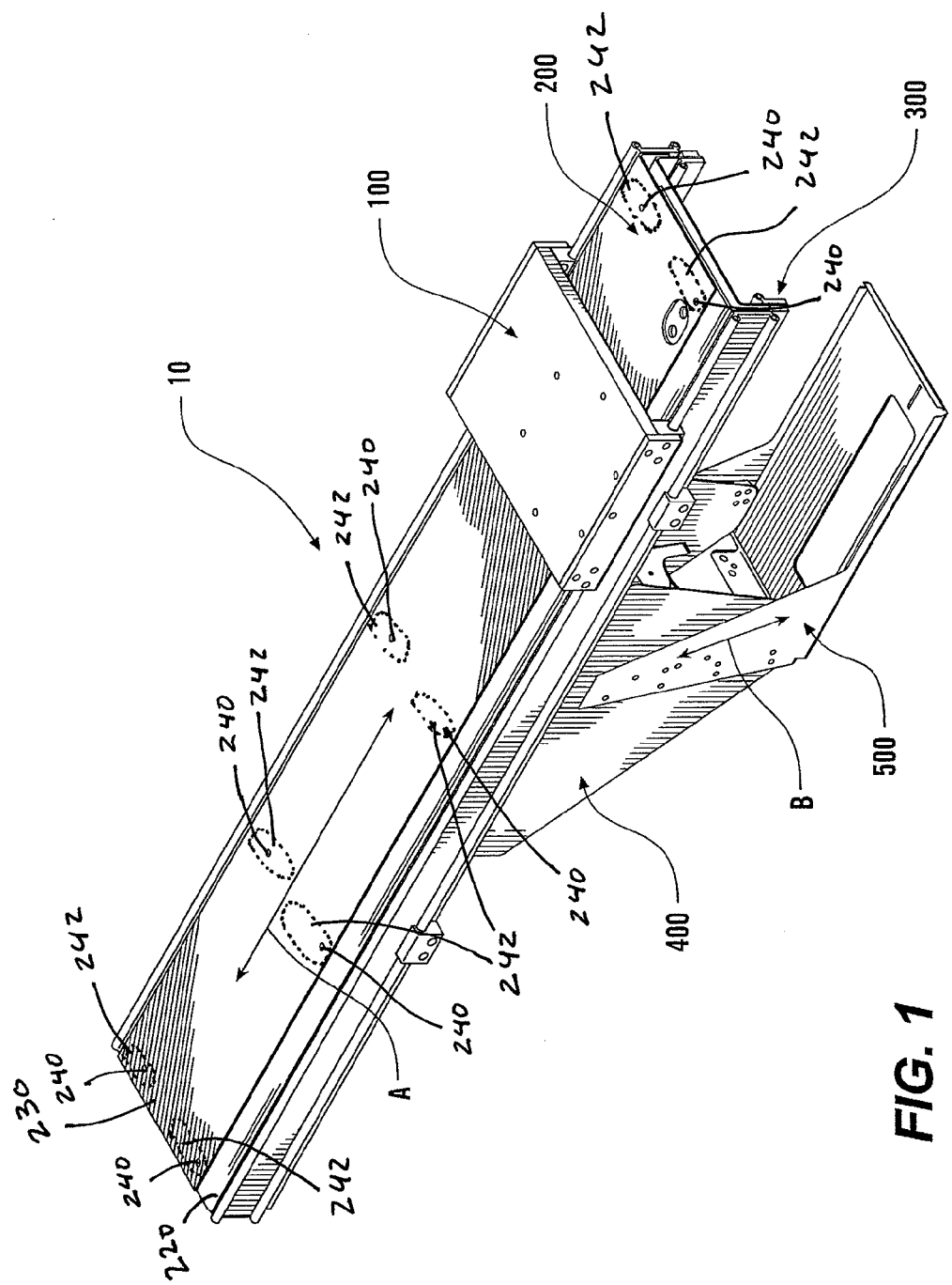
FIG. 1 is a perspective view of one exemplary embodiment of a dynamically adjusting tracking system.
Figure 2:
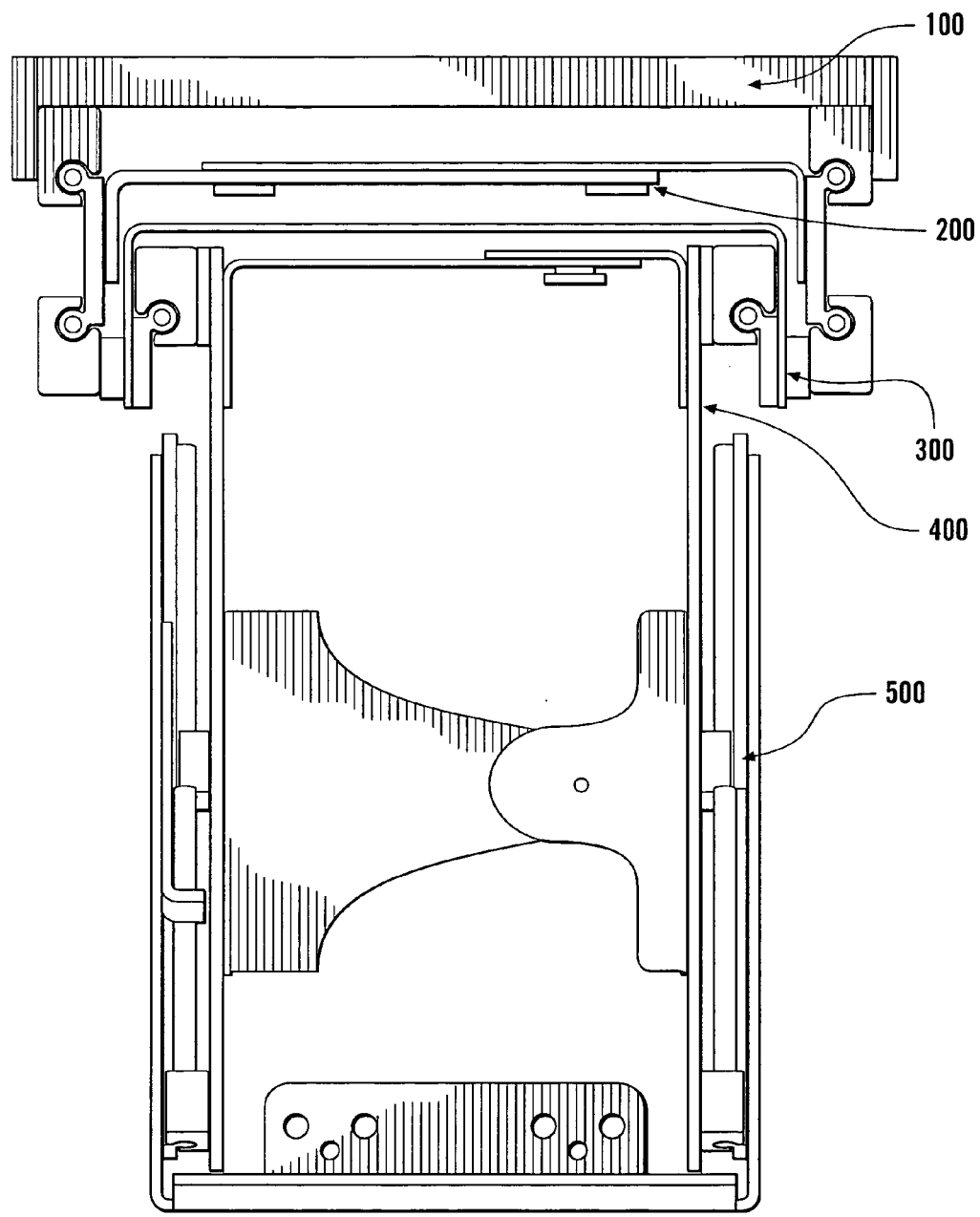
FIG. 2 is a front plan view of one exemplary embodiment of multiple adjustable tracking systems according to this invention used in parallel with each other.

FIG. 1 shows an exemplary embodiment of an assembly 10 that includes various exemplary embodiments of multiple nested tracking systems according to this invention. FIG. 2 shows a front plan view of the exemplary embodiment shown in FIG. 1. This view more clearly shows the specific relationships between the components of the assembly 10. As shown in FIGS. 1 and 2, the assembly 10 contains a first relatively rigid component 100, a first adjustable component 200, a second relatively rigid component 300, a second adjustable component 400, and a third relatively rigid component 500. In various exemplary embodiments, the first relatively rigid component 100 is attached to a fixed member of a larger assembly, such as a beam or plate, that restricts the ability of the component 100 to move in space.

The first adjustable component 200 moves laterally along a direction A with respect to the first relatively rigid component 100. The second relatively rigid component 300 moves laterally along a direction A with respect to the first adjustable component 200. The second adjustable component 400 also moves laterally along a direction A with respect to the component 300. The third relatively rigid component 500 moves laterally along a direction B with respect to the second adjustable component 400. In various exemplary embodiments, the third relatively rigid component 500 may have a saw or other tool mounted to it.

It should be appreciated that, in various exemplary embodiments, the first relatively rigid component 100, the first adjustable component 200, the second relatively rigid component 300, the second adjustable component 400, and the third relatively rigid component 500 are connected as outlined above using linear slide bearings and linear shafts that restrict the path of movement of the components 100-500 with respect to each other. Linear slide bearings are desirable because they allow the components 100-500 to move relative to one another over substantial distances while maintaining the relative positions of the components relative to each other in the orthogonal directions to a high precision and accuracy. A typical interface between two of the components 100-500 typically includes two slide bearings, comprising two linear shafts connected to a first one of the components 100-500, and two or more sets of linear bearings connected to a second one of the components 100-500.

For example, if the user wanted to move the second adjustable component 400 laterally along the direction A with respect to the first relatively rigid component 100, that motion might be achieved by moving one or more of the first adjustable component 200, the second relatively rigid component 300, and/or the second adjustable component 400 relative to the first relatively rigid component 100. As the components 100-400 are nested, the overall amount of relative displacement of the second adjustable component 400 with respect to the first relatively rigid component 100 is greater than the provided amount of relative displacement between any of the individual components 100-400 of the assembly 10.

It should also be appreciated that, in the assembly 10, as often occurs in practice, multiple linear bearings travel along each linear shaft, further complicating the alignment problem. For example, at the track interface between the first relatively rigid component 100 and the first adjustable component 200, two or more linear bearings ride along each of the two linear shafts. The linear bearings mounted on each shaft must be in proper alignment with each other and with respect to the particular shaft they travel along. Additionally, the two shafts should be aligned in a way such that they are acceptably parallel with each other along the path of motion that the slide bearing creates. Furthermore, all of the linear bearings on the two linear shafts must be toleranced such that along the path of motion, no single linear bearing interferes with the linear shaft the linear bearings travel along, along the entire length of the path of motion. The problems that arise with precise dimensional control may be further complicated in applications that demand more than two linear shafts, nested tracking systems, or in systems subject to variable stress.

It should be appreciated that this assembly contains three relatively rigid components. That is, the components 100, 300, and 500 are relatively rigid components. It should also be appreciated that this assembly contains two adjustable components 200 and 400 that may be relatively flexible relative to the relatively rigid components 100, 300 and 500. In various exemplary embodiments, the first and second adjustable components 200 and/or 400 contain both relatively rigid sub-components as well as relatively elastically deformable sub-components.

In these exemplary embodiments, the adjustable sub-component 200 and/or 400 elastically deforms to adjust either the hole-to-hole distance or the center-to-center distance to match the other distance as the slide bearings travel along the linear shafts. The flexible sub-components in the components 200 and 400 effectively act as internal springs that allow either the hole-to-hole or center-to-center distance of the slide bearings to adjust to meet the dimensional requirements of the relatively rigid components 100, 300 or 500.

In various other exemplary embodiments, the first sub-component and the second sub-component of the adjustable components 200 and/or 400 can be attached to each other so that the first and second sub-components can move or slide laterally relative to each other to adjust the hole-to-hole of the linear bearings or the center-to-center distance of the linear bearings of the linear shafts that are attached to the adjustable component 200 or 400 to match the center-to-center distance of the linear shafts or the hole-to-hole distance of the linear bearing that are attached to the relatively rigid first or second component 100 or 300.

In still other exemplary embodiments, the second adjustable component includes a hinge structure between the first sub-component and at least the portion of the second sub-component to which the linear bearings or the linear shaft are attached. The hinge structure allows at least that portion of the second sub-component to rotate relative to the first sub-component to adjust the hole-to-hole of the linear bearings or the center-to-center distance of the linear bearings of the linear shafts that are attached to the adjustable component 200 or 400 to match the center-to-center distance of the linear shafts or the hole-to-hole distance of the linear bearing that are attached to the relatively rigid first or second component 100 or 300.

In still other exemplary embodiments, two or more of these structures and/or adjusting mechanisms are incorporated into each of the first and/or second adjustable components 200 and/or 400. Thus, the second adjustable component 200 may have an elastically deformable second sub-component that is attached to the first sub-component such that the first and second sub-components can move relative to one another laterally. Alternatively, the second adjustable component 200 can include first and second sub-components that are attached to each other so that they can move laterally relative to each other. Additionally, that second sub-component could be divided into two portions that are attached to each other using a hinge structure that is located between the first sub-component and the portion of the second sub-component that the linear bearings or the linear shaft are attached to.

Figure 3:
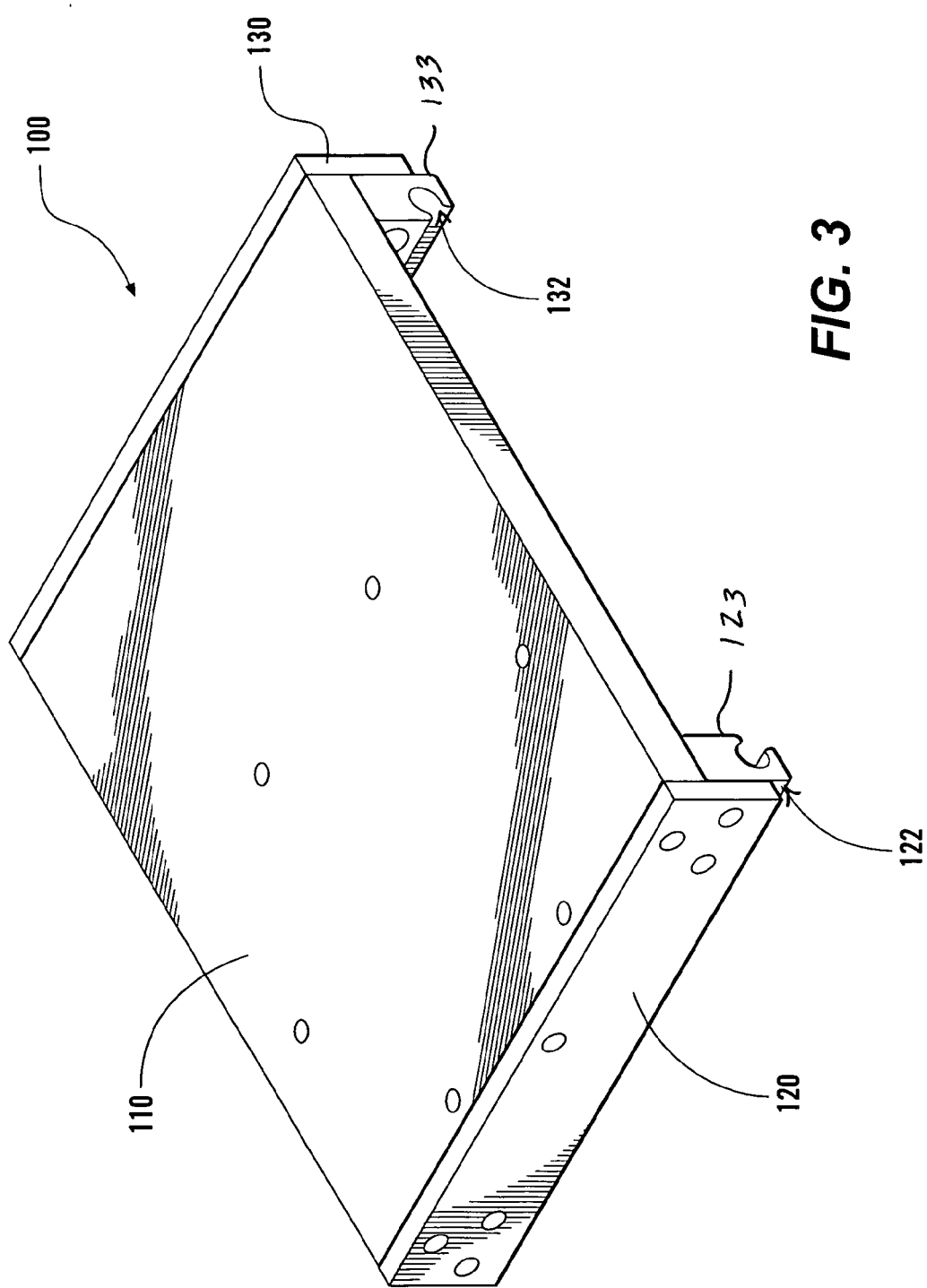
FIG. 3 illustrates one exemplary embodiment of a first component of the exemplary embodiment of the tracking assembly shown in FIGS. 1 and 2.

FIG. 3 shows in greater detail one exemplary embodiment of the first relatively rigid component 100 shown in FIGS. 1 and 2. As shown in FIG. 3, the first relatively rigid component 100 includes a top plate 110, two side plates 120 and 130, and two sets of linear bearings 122 and 132. Because the first relatively rigid component 100 is rigid relative to the first adjustable component 200, the hole-to-hole distance between the two linear bearing sets 122 and 132 is fixed.

It should be appreciated that, in a typical conventional track system, the alignment of the two linear bearing sets 122 and 132 would be particularly important. In particular, the linear bearings in each set of linear bearings would need to be well aligned with each other. Hence, each bearing 123 in the first set of linear bearings 122 would need to be both translationally and rotationally aligned with each other bearing 123 in the first set of linear bearings 122. Similarly, each linear bearing 133 in the second set of linear bearings 132 would also need to be both translationally and rotationally aligned with each other bearing 133 in the second set of linear bearings 132. Additionally, both sets of linear bearings 122 and 132 would need to be parallelly aligned to each other, such that the hole-to-hole distance between the sets of linear bearings 122 and 132 would be effectively identical to the center-to-center distance between the linear shafts that these linear bearings would slide along.

While, in various exemplary embodiments of systems and methods according to this invention, it is still desirable that the linear bearings be well aligned, it is not as critical as in conventional track systems where all of the mating components are completely rigid. Because there is some inherent flexibility and/or adjustability in the first and second adjustable components 200 and 400, it is less necessary that the linear bearings 123 and 133 in the respective sets of the linear bearings 122 and 132 be precisely aligned with each other and with the other set of linear bearings at the very high tolerances required in the conventional track systems.

It should also be appreciated that the second relatively rigid component 300 and third relatively rigid 500, while possessing distinctly different shapes from the first relatively rigid component 100, are functionally similar, in that each of these relatively rigid components 100, 300 and 500 contains one half of a slide bearing assembly and that the component is relatively rigid in the assembly of its contained sub-components.

Figure 4:
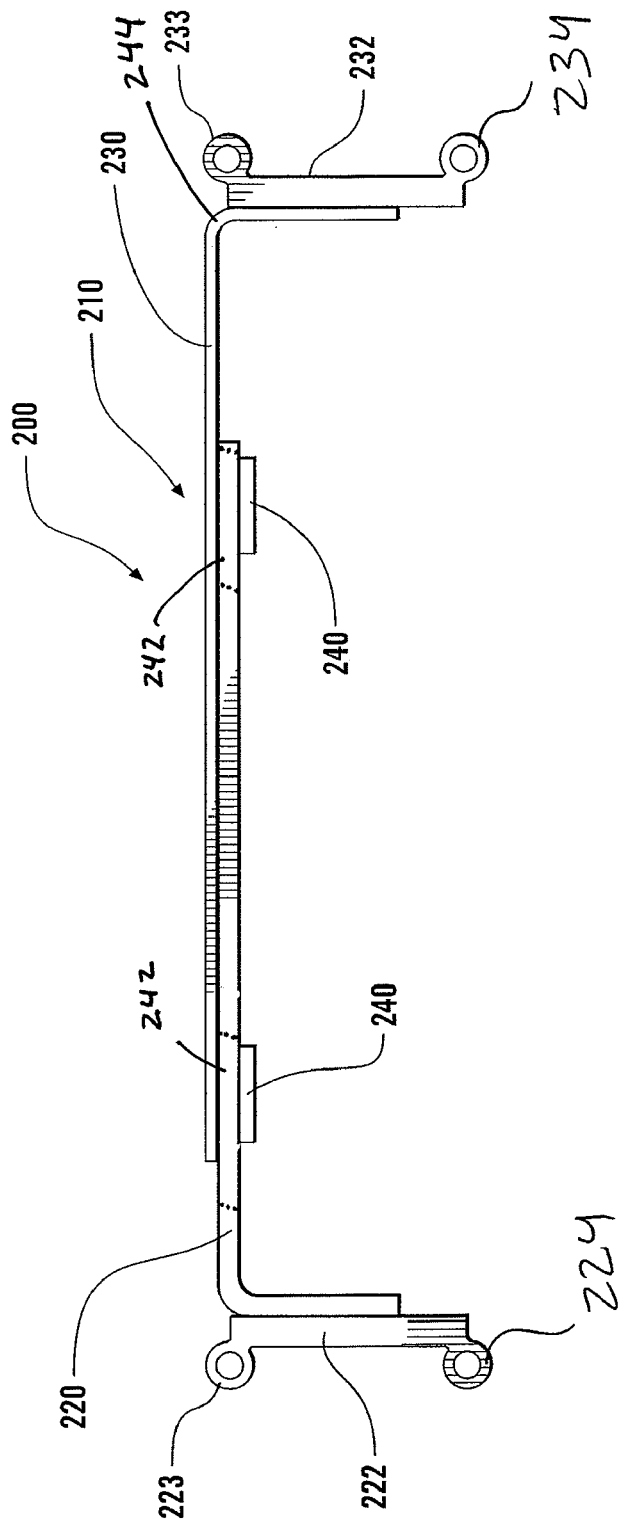
FIG. 4 is a front plan view of one exemplary embodiment of a second component of the exemplary embodiment of the tracking system shown in FIGS. 1 and 2.

FIG. 4 is a plan view showing in greater detail one exemplary embodiment of the first adjustable component 200 shown in FIGS. 1 and 2. The first adjustable component 200 contains a plate assembly 210 comprising a relatively rigid sub-component 220 and a flexible sub-component 230. As shown in FIG. 4, a first set of linear shafts 222 is attached to the relatively rigid sub-component 220, while a second set of linear shafts 232 is attached to the flexible sub-component 230. One or more fasteners 240 attach the relatively rigid sub-component 220 and the flexible sub-component 230 together to form the plate assembly 210. The upper linear shafts 223 and 233 of the first flexible component 200 mate with the two sets of linear bearing 122 and 132, respectively, of the rigid component 100.

At any given point along the first and second sets of linear shafts 222 and 232, the center-to-center distances between the upper linear shafts 223 and 233 can vary because, under at least mild stress, the flexible sub-component 230 locally elastically deforms to at least partially adjust the center-to-center distance between the upper precision linear shafts 223 and 233 to match the hole-to-hole distance between the pairs of linear bearings 123 and 223 attached to the first relatively rigid component 100. Thus, the center-to-center distances between the upper linear shafts 223 and 233 do not need to be constant over the usable length. Consequently, it is not necessary to place the upper linear shafts 223 and 233 such that the placement tolerances are extremely high, as is conventionally required when mounting the sets of linear shafts 222 and 232.

That is, because the component 100 has a fixed hole-to-hole distance between each pair of linear bearings 123 and 133 formed between the sets of linear bearings 122 and 132, as the first adjustable component 200 travels along the direction A, the flexible sub-component 230 allows the center-to-center distance between corresponding portions of the linear shafts 223 and 233 as those travel past a given pair of linear bearings 123 and 133 to at least partially match the fixed hole-to-hole distance that is present between that pair of linear bearings 123 and 133.

Then, after those portions of the upper linear shafts 223 and 233 move away from that pair of linear bearings 123 and 133 at least the local portion of the flexible sub-component 230 returns to a rest or unstressed position. Thus, the flexibility inherent in the flexible sub-component 230 of the second adjustable component 200 allows for the tolerances used in positioning and aligning the linear bearings 123 and 133 on the first relatively rigid component 100 and the first and second sets of linear shafts 222 and 232 on the first flexible component 200 to be significantly less than they would be in a device in which the components 100 and 200 were both fully rigid elements.

It should also be appreciated that the fastening subcomponents 240 do not need to be rigid. In this particular exemplary embodiment, the fastening sub-components 240 are padded by rubber washers that allow for even more built in elasticity at the location of these joints. In addition to the rubber stoppers, in various exemplary embodiments, additional rotational and translational flexibility of the relatively rigid sub-component 220 relative to the relatively flexible sub-component 230, is obtained by providing slots in one or both of the sub-components and fastening them together so that the they remain able to move relative to one another.

At any given point along the first and second sets of linear shafts 222 and 232, the center-to-center distances between the upper linear shafts 223 and 233 can vary because, under at least mild stress, the flexible sub-component 230 locally elastically deforms to at least partially adjust the center-to-center distance between the upper precision linear shafts 223 and 233 to match the hole-to-hole distance between the pairs of linear bearings 123 and 223 attached to the first relatively rigid component 100. That is, because the component 100 has a fixed hole-to-hole distance between each pair of linear bearings 123 and 133 formed between the sets of linear bearings 122 and 132, as the first adjustable component 200 travels along the direction A, the flexible sub-component 230 allows the center-to-center distance between corresponding portions of the linear shafts 223 and 233, as those travel past a given pair of linear bearings 123 and 133, to at least partially match the fixed hole-to-hole distance that is present between that pair of linear bearings 123 and 133.

Then, after those portions of the upper linear shafts 223 and 233 move away from that pair of linear bearings 123 and 133 at least the local portion of the flexible sub-component 230 returns to a rest or unstressed position. Thus, the flexibility inherent in the flexible sub-component 230 of the second adjustable component 200 allows for the tolerances used in positioning and aligning the linear bearings 123 and 133 on the first relatively rigid component 100 and the first and second sets of linear shafts 222 and 232 on the first flexible component 200 to be significantly less than they would be in a device in which the components 100 and 200 were both fully rigid elements.

It should also be appreciated that the dynamically adjusting nature of the first adjustable component 200 may also be used in alternate configuration, such as that of the second adjustable component 400. That is, it is possible to place the linear bearings instead of the linear shafts on the adjustable component. Furthermore, the path of motion is not necessarily restricted to a horizontal direction. There may be multiple ways to configure or align any such tracking system in a component assembly.

It should also be appreciated that the flexible sub-component 230 does not necessarily need to be a unitary structure. Thus, instead of the flexible sub-component 230 being a single elastically deformable element, the flexible sub-component 230 can be implemented as a first member that is connected to the rigid sub-component 220 by the fastening sub-components 240 and a second member that is connected to the first member by one or more hinges or the like. In various exemplary embodiments, the one or more hinges can be implemented using a piano hinge that is approximately at least as long as the linear shaft 232. Thus, instead of gaining its adjustable nature from the elastic behavior of the material used to form the flexible sub-component 230, the at least one hinge or the like acts as a mechanical way of allowing the flexible sub-component 230 to elastically deform.

Figure 5:
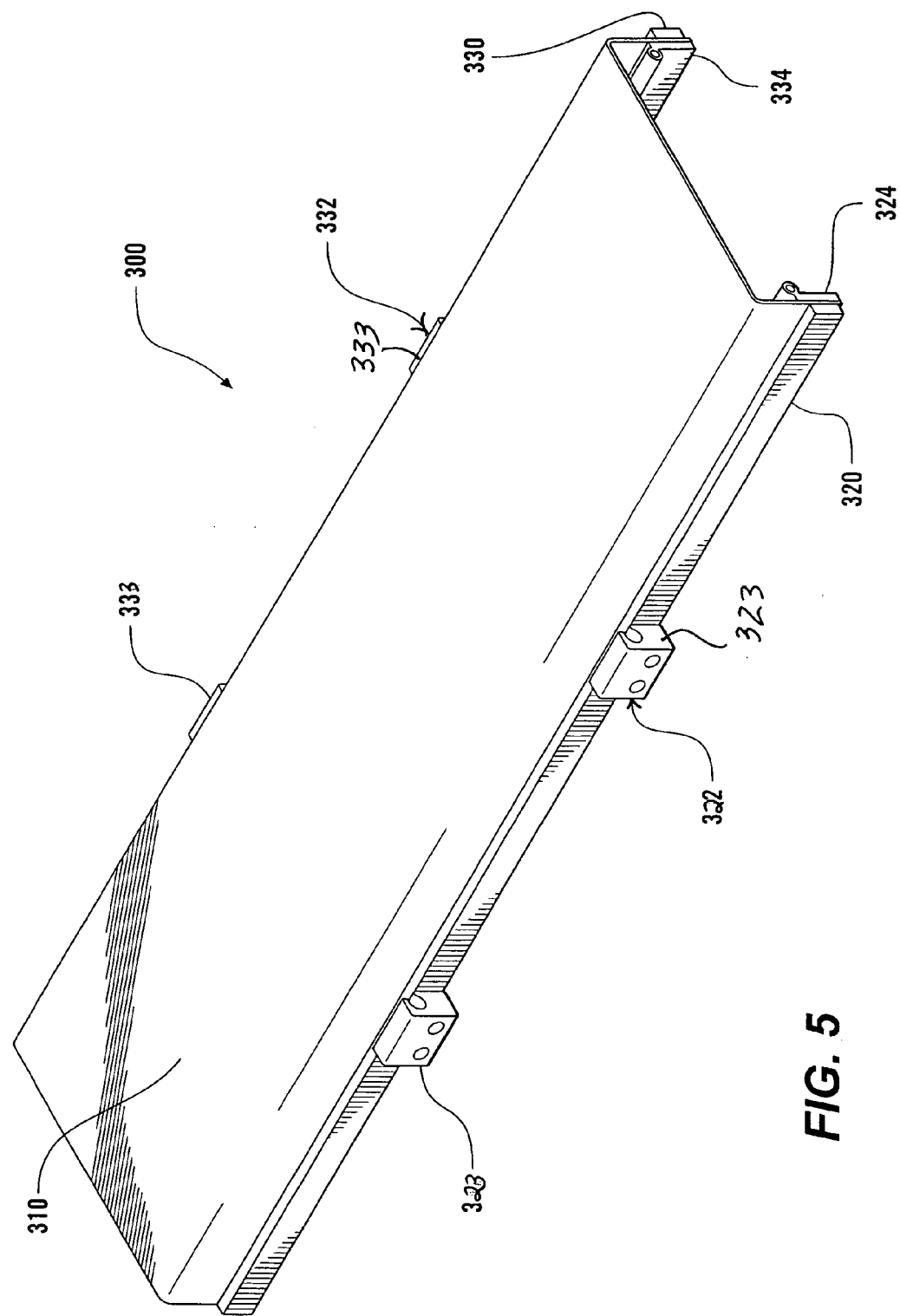
FIG. 5 is a perspective view of one exemplary embodiment of a rigid transition component that allows multiple adjustable tracking systems to be used in parallel with each other.
Figure 7:
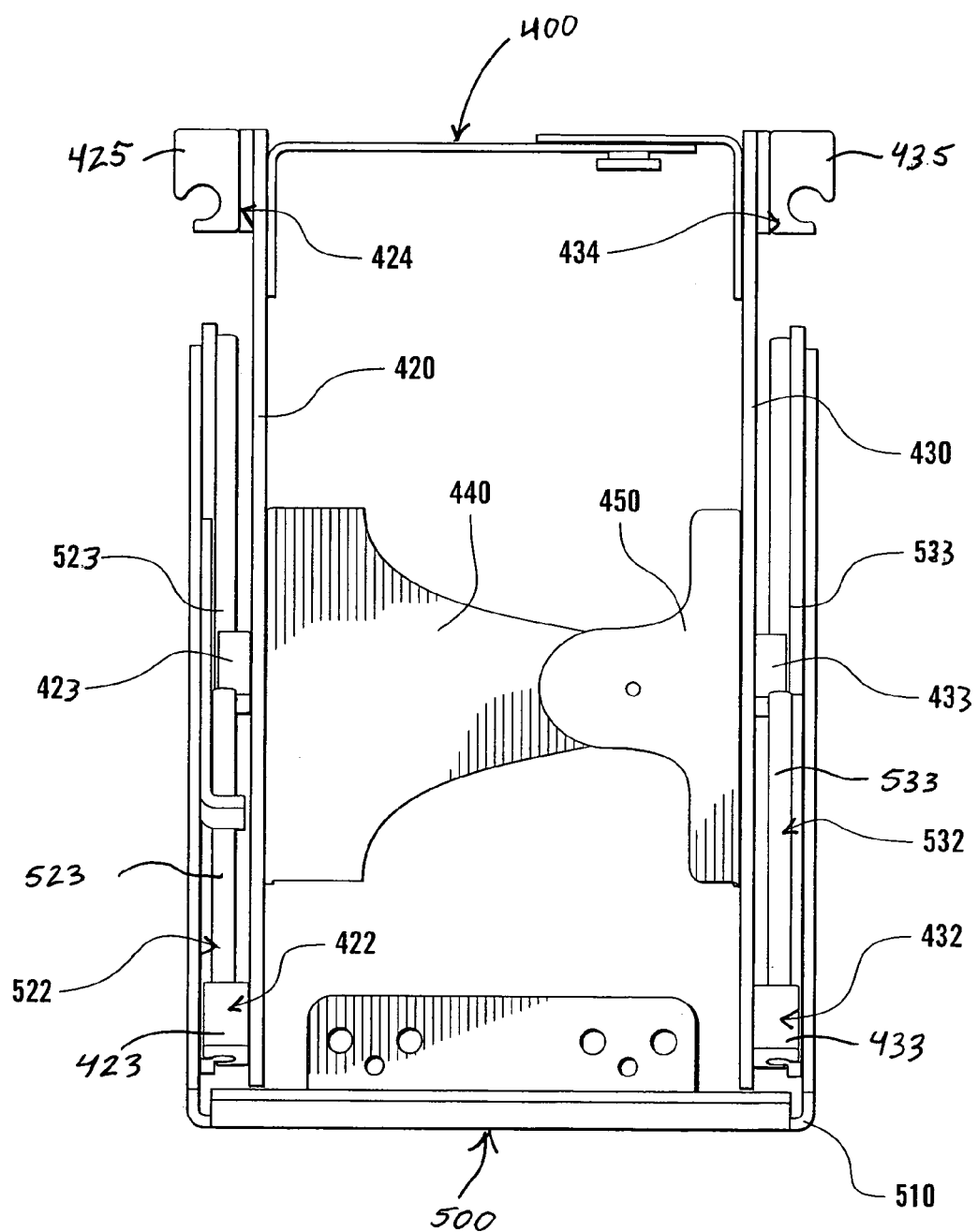
FIG. 7 is a front plan view of one exemplary embodiment of a device in which the slide bearings are aligned in a nearly orthogonal direction and two bracing elements, one rigid and one flexible, allow the inner walls of the device attached to the slide bearings to dynamically adjust to true as the device moves.

FIG. 5 shows in greater detail one exemplary embodiment of the second relatively rigid component 300 of the assembly 10. The relatively rigid component 300 contains a relatively rigid sub-component 310, third and fourth sets of linear bearings 322 and 332, which are attached to the exterior of relatively rigid sub-component 310, and two linear shafts 324 and 334, which are attached to the interior of the relatively rigid sub-component 310. The exterior linear slide bearings 323 and 333 of the third and fourth sets of linear bearings 322 and 332 will mate with the lower linear shafts 224 and 234 of the first and second sets of linear shafts 222 and 232 attached to the first adjustable component 200. Additionally, as shown in FIGS. 5 and 7, the lower linear shafts 324 and 334 mounted on the relatively rigid sub-component 310 mate with the linear bearings 425 and 435 of the fifth and sixth sets of linear bearings 424 and 434 mounted on the second adjustable component 400.

It should be appreciated that the second relatively rigid component 300 maintains horizontal and vertical position relative to the relatively rigid sub-component 220. It should be noted that all of the relatively rigid sub-components are positioned on the left hand side of the plan view of FIG. 2. This effectively creates a kind of "ground" position at the first relatively rigid component 100 including the set of linear bearings 122. This ground position is then transferred down to the linear shaft 222 and the rigid sub-component 220, and is then transferred down through the second relatively rigid component 300 and the third set of linear bearings 322 and the linear shaft 324.

The second relatively rigid component 300 is thus grounded to the first relatively rigid component 100 by the slide bearings, including the linear bearings 123 of the first set of linear bearings 122 and the linear shaft 223, the relatively rigid sub-component 220, and the slide bearing including the linear shaft 224 and the linear bearings 323 of the third set of linear bearings 322. The linear shaft 324 and the linear bearings 425 of the fifth set of linear bearings 424 then acts as a ground point for the mating components in the tray assembly, including the second adjustable component 400 and the third relatively rigid component 500 mating with the set of linear bearings 432 attached to the third relatively rigid component 500.

It should be appreciated that while the left side linear bearings and flexible sub-components behave as grounds for the sliding components, the right hand side of the plan view of FIG. 2 serves as a floating guide. The right hand side linear bearings and flexible sub-components in this particular application are designed to adjust to meet the dimensional requirements of the rigid hole-to-hole or center-to-center distance as defined by the mating rigid component.

It should be appreciated that there are other ways to create the ground point, and/or to connect the first and second sub-components 220 and 230 of the first adjustable component 200. For example, in various exemplary embodiments, the first and second subcomponents 220 and 230 can each be attached to a mounting structure that can act to define a ground position. In this exemplary embodiment, one or both of the first and second sub-components 220 and 230 can have elongated holes and be attached to this mounting structure using the fastening sub-components 240, so that one or both of the first and second sub-components 220 and 230 can move laterally relative to the mounting structure and thus to each other. The mounting structure can be a part of a machine, a table, a footing, or any other structure or device that is able to act as a mount for the first and second sub-components 220 and 230.

Thus, as the relatively rigid component 100 moves along the direction A relative to the relatively adjustable component 200, one or both of the first and second sub-components 220 and 230 can move relative to the mounting structure, and thus to each other, to adjust the hole center-to-hole center or shaft center-to-shaft center distance, respectively, of the one of the linear bearings or linear shafts attached to the relatively adjustable component 200 to match the other of the shaft center-to-shaft center or hole center-to-hole center distance, respectively, of the other one of the linear shafts or linear bearings attached to the relatively rigid component 100.

As outlined above, a hinge can be located between the first and second sub-components 220 and 230 of the relatively flexible component 200. In various exemplary embodiments, this hinge can be used to connect the first and second sub-components to each other. In various exemplary embodiments, this hinge can be used to attach separate portions of the sub-component 230, while other structures or devices are used to connect the first and second sub-components 220 and 230.

Figure 6:
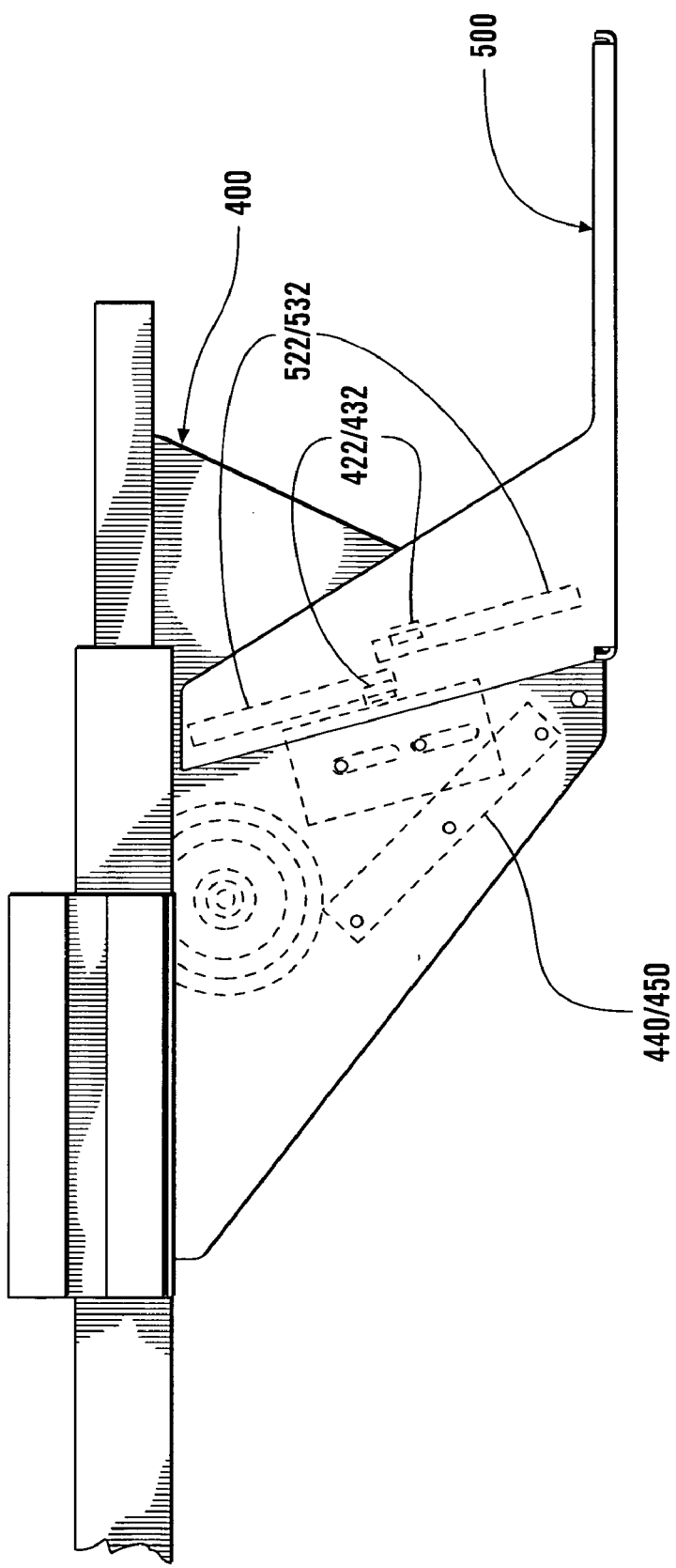
FIG. 6 is a side view of one exemplary embodiment of a device that includes a slide bearing system according to this invention that is aligned in a nearly orthogonal direction.

FIG. 6 and FIG. 7 are side and plan views of one exemplary embodiment of a tray assembly that includes the second adjustable component 400 and the third relatively rigid component 500. The second adjustable component includes two rigid plate sub-components 420 and 430; four sets of linear bearings 422, 424, 432, and 434; a relatively rigid sub-component 440; and a flexible sub-component 450. The third relatively rigid component 500 includes a relatively rigid tray 510; two sets of linear shafts 522 and 532; and a stop 524.

The relatively rigid sub-component 440 is attached to the rigid plate sub-component 420. The rigid plate sub-component 420 is also attached to two linear bearings 423 of the set of linear bearings 422. The flexible sub-component 450 is attached to the rigid plate sub-component 430, which is then attached to two linear bearings 433 of the set of linear bearings 432. The linear bearings 423 of the set of linear bearings 422 then mate with the linear shafts 523 of the set of linear shafts 522 that are attached to one side of the relatively rigid tray component 510. The set of linear side bearings 422 mate with the set of linear shafts 522. The linear bearings 433 of the set of linear bearings 432 mate with the linear shafts 533 of the set of linear shafts 532 that are attached to the other side of the relatively rigid tray component 510. It should be appreciated that the second adjustable component 400 mates to both the second relatively rigid component 300 and the third relatively rigid component 500.

The second flexible component 400 is adjustable due to using two tray stabilizer guides, which include the relatively rigid sub-component 440 and the flexible sub-component 450. The relatively rigid sub-component 440 is analogous to the relatively rigid sub-component 220 and the flexible sub-component 450 is an analogous to the flexible sub-component 230 of the first adjustable component 200. This means that the relatively flexible sub-component 450 is a more elastic and flexible element than is the relatively rigid sub-component 440, allowing the two rigid plates 420 and 430, that are attached to adjust the two rigid plates 420 and 430, move relative to each other as the linear bearings 423 and 433 of the sets of linear bearings 422 and 432 move along the linear shafts 523 and 533 of the set of linear shafts 522 and 532.

It should be appreciated that the various devices and structures described above allow the relative orientation and positioning of the linear bearings and the linear shafts to be relaxed. It should be appreciated that, by using the various devices and structures according to this invention, the linear shafts do not need to remain substantially straight, substantially parallel and/or spaced at a substantially constant distance from each other. Likewise, the linear bearings do not need to remain substantially parallel and/or spaced at a substantially constant distance from each other. Rather, they can be pitched, yawed or rolled relative to each other and/or the linear shafts without creating a situation where the linear bearings bind up on the linear shafts as they moving relative to the linear shafts.

While various exemplary embodiments according to this invention have been described above, various alternatives, modifications, variations, improvements, and/or substantial equivalents, whether known or that are or may be presently unforeseen, may become apparent to those having at least ordinary skill in the art. Accordingly, the exemplary embodiments according to this invention, as set forth above, are intended to be illustrative, not limiting of the scope of this invention. Various changes may be made without departing from the spirit and scope of this invention. Therefore, this invention is intended to embrace embodiments beyond those outlined above, as well as all known or later-developed alternatives, modifications, variations, improvements, and/or substantial equivalents of the exemplary embodiments outlined above.

What is claimed is:

1. A slide bearing system having reduced positioning and alignment tolerances, comprising:
a first subset of at least one linear bearing;
a second subset of at least one linear bearing;
a first guide shaft structure having at least one linear shaft and having a usable length; and
a second guide shaft structure having at least one linear shaft and having a usable length, wherein the linear bearings of the first and second subsets are configured to extend at least partially around and to slide along the linear shafts of the first and second guide shaft structures;
a first relatively rigid component, with two of:
the first subset of at least one linear bearing,
the second subset of at least one linear bearing,
the first linear shaft structure, and
the second linear shaft structure,
attached to the first relatively rigid component at a first separation distance and at a first orientation relative to each other;
a second adjustable component, with the remaining two of:
the first subset of at least one linear bearing,
the second subset of at least one linear bearing,
the first linear shaft structure, and
the second linear shaft structure,
attached to the second adjustable component at a second separation distance, the second separation distance being generally equal to the first separation distance over the usable length, and at a second orientation to each other that generally corresponds to the first orientation over the usable length;
wherein, as the first relatively rigid component and second adjustable component move relative to each other along the usable length, at least a portion of the second adjustable component moves relative to the first relatively rigid component so that at least one of the second separation distance and the second orientation effectively matches the corresponding ones of the first separation distance and the first orientation.

2. The system of claim 1, wherein:
the two of the first subset of at least one linear bearing, the second subset of at least one linear bearing, the first linear shaft structure, and the second linear shaft structure attached to the relatively rigid component are the first and the second subsets of at least one linear bearing;
the remaining two of the first subset of at least one linear bearing, the second subset of at least one linear bearing, the first linear shaft structure, and the second linear shaft structure attached to the adjustable component are the first and second linear shaft structures;
the first and second subsets of at least one linear bearing attached to the relatively rigid component have a fixed hole center to hole center distance; and
the first and second linear shafts of the first and second linear shaft structures attached to the adjustable component have a variable shaft center to shaft center distance.

3. The system of claim 2, wherein the second adjustable component moves relative to the first relatively rigid component at least in portions of the second adjustable component around positions of the linear bearings of the second subset of linear bearings along a linear shaft of the second linear shaft structure to alter the shaft center to shaft center distance to match hole center to hole center distance.

4. The system of claim 3, wherein:
the second adjustable component is fixed; and
the first relatively rigid component moves relative to the second adjustable component.

5. The system of claim 3, wherein the second adjustable component further comprises:
a relatively rigid sub-component to which the first linear shaft structure is attached; and
a relatively flexible sub-component to which the second linear shaft structure is attached;
wherein the second adjustable component flexes by elastic deformation of the relatively flexible sub-component to adjust the shaft center to shaft center distance of the first and second linear shaft structures to match the hole center to hole center distance of the linear bearings of the first relatively rigid component.

6. The system of claim 3, wherein the first relatively rigid component is fixed to an immobile structure and the second adjustable component moves relative to the first relatively rigid component.

7. The system of claim 3, further comprising:
third and fourth linear shaft structures attached to the second adjustable component at a second shaft center to shaft center distance; and
a third relatively rigid component having a third subset of at least one linear bearing and a fourth subset of at least one linear bearing, the third and fourth subsets of at least one linear bearing attached to the third relatively rigid component at a second hole center to hole center distance; and
wherein, as the third relatively rigid component moves relative to the second adjustable component along the usable length, the second adjustable component moves relative to the third relatively rigid component at least in portions of the second adjustable component around positions of the linear bearings of the fourth subset of linear bearings along a linear shaft of the fourth linear shaft structure to alter the second shaft center to shaft center distance of the third and fourth linear shaft structures to match the second hole center to hole center distance of the third and fourth subsets of at least one linear bearing.

8. The system of claim 7, wherein the second shaft center to shaft center distance between the third and fourth linear shafts is generally equal to the second hole center to hole center distance between the third and fourth linear shafts over the usable length.

9. The system of claim 7, wherein the second adjustable component further comprises:
a relatively rigid sub-component to which the third linear shaft structure is attached; and
a relatively flexible sub-component to which the fourth linear shaft structure is attached;
wherein the second adjustable component flexes by elastic deformation of the relatively flexible sub-component to adjust the second shaft center to shaft center distance to match the second hole center to hole center distance.

10. The system of claim 7, further comprising:
fifth and sixth linear shaft structures attached to the third relatively rigid component at a third shaft center to shaft center distance; and
a fourth adjustable component having a fifth set of at least one linear bearing and a sixth set of at least one linear bearing, the fifth and sixth sets of at least one linear bearing attached to the fourth adjustable component at a third hole center to hole center distance; and wherein, as the third relatively rigid component moves relative to the fourth adjustable component along the usable length, the fourth adjustable component moves relative to the third relatively rigid component at least in portions of the fourth adjustable component around positions of the linear bearings of at least one of the fifth and sixth sets of linear bearings along a linear shaft of the fifth and sixth linear shaft structures to alter the third hole center to hole center distance of the fifth and sixth sets of at least one linear bearing to match the third shaft center to shaft center distance of the fifth and sixth linear shaft structures.

11. The system of claim 7, wherein the motion of the second adjustable component relative to the first relatively component rigid component is on a different plane than the motion of the second adjustable component relative to the third relatively rigid component.

12. The system of claim 7, wherein:

the first relatively rigid component is fixed;

the second adjustable component and third relatively rigid component move relative to the fixed first relatively rigid component; and the third relatively rigid component moves relative to the second adjustable component.

13. The system of claim 7, wherein:

the second adjustable component is fixed; and the first relatively rigid component and the third relatively rigid component move relative to the fixed second adjustable component.

\* \* \* \* \*